United States Patent
Lee et al.

(10) Patent No.: US 12,238,701 B2
(45) Date of Patent: Feb. 25, 2025

(54) METHOD AND DEVICE FOR DETERMINING TRANSPORT BLOCK SIZE IN NR V2X

(71) Applicant: LG Electronics Inc., Seoul (KR)

(72) Inventors: Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 17/599,680

(22) PCT Filed: Mar. 30, 2020

(86) PCT No.: PCT/KR2020/004379
§ 371 (c)(1),
(2) Date: Sep. 29, 2021

(87) PCT Pub. No.: WO2020/204559
PCT Pub. Date: Oct. 8, 2020

(65) Prior Publication Data
US 2022/0201711 A1 Jun. 23, 2022

Related U.S. Application Data

(60) Provisional application No. 62/826,935, filed on Mar. 29, 2019.

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0044* (2013.01); *H04W 72/0446* (2013.01); *H04W 72/20* (2023.01)

(58) Field of Classification Search
CPC ..... H04W 72/02; H04W 72/04; H04W 72/20; H04W 72/56; H04W 72/23;
(Continued)

(56) References Cited

U.S. PATENT DOCUMENTS 8,937,919 B2 * 1/2015 Pi ........................... H03M 7/24
455/450
9,001,726 B2 * 4/2015 Liang ................... H04L 1/0013
370/492
(Continued)

FOREIGN PATENT DOCUMENTS

CN 110063079 A * 7/2019 .......... H04L 1/0002
KR 20180135867 12/2018
(Continued)

OTHER PUBLICATIONS

T. Kim, Y. Kim, M. Jung and H. Son, "Intelligent Partial-Sensing-Based Autonomous Resource Allocation for NR V2X," in IEEE Internet of Things Journal, vol. 11, No. 2, pp. 3144-3160, 15 Jan. 15, 2024, doi: 10.1109/JIOT.2023.3295024 (Year: 2024).*
(Continued)

*Primary Examiner* — William D Cumming
(74) *Attorney, Agent, or Firm* — Fish & Richardson P.C.

(57) ABSTRACT

Provided are a method for a first device carrying out wireless communication, and a device supporting same. The method may comprise the steps of: determining the number of resource elements (REs) for determining a Transport Block Size (TBS) on the basis of the number of REs in a single slot and the number of REs on a Physical Sidelink Control Channel (PSCCH) resource in the single slot; acquiring an intermediate number associated with the TBS by multiplying the number of REs for determining the TBS, a code rate, a modulation order and the number of layers; quantizing the intermediate number; determining the TBS on the basis of the quantized intermediate number; and transmitting a side-
(Continued)

link (SL) to a second device on the basis of the determined TBS. Here, the number of REs for determining the TBS may be determined by excluding the number of REs on the PSCCH resource.

12 Claims, 21 Drawing Sheets

(51) Int. Cl.
*H04W 72/0446* (2023.01)
*H04W 72/20* (2023.01)

(58) Field of Classification Search
CPC ............. H04W 72/0446; H04W 28/10; H04W 28/0273; H04W 72/542
USPC ........ 455/450; 370/332, 328, 315, 252, 492, 370/336
See application file for complete search history.

(56) References Cited

U.S. PATENT DOCUMENTS

| | | | | |
|---|---|---|---|---|
| 9,794,922 B2* | 10/2017 | Xu | | H04W 72/23 |
| 10,314,029 B2* | 6/2019 | Xu | | H04W 72/0446 |
| 10,601,567 B2* | 3/2020 | Marinier | | H04L 1/0028 |
| 10,707,988 B2* | 7/2020 | Salah | | H04L 1/0009 |
| 10,856,308 B2* | 12/2020 | Lin | | H04L 1/0035 |
| 10,938,540 B2* | 3/2021 | Seo | | H04L 1/0026 |
| 10,939,321 B2* | 3/2021 | Davydov | | H04W 28/10 |
| 11,032,053 B2* | 6/2021 | Marinier | | H04L 1/1861 |
| 11,051,202 B2* | 6/2021 | Davydov | | H04W 28/10 |
| 11,184,903 B1* | 11/2021 | Lin | | H04L 1/0009 |
| 11,464,007 B2* | 10/2022 | Lee | | H04W 72/04 |
| 11,464,025 B2* | 10/2022 | Chae | | H04W 72/56 |
| 11,497,035 B2* | 11/2022 | Lin | | H04L 1/0003 |
| 11,509,415 B2* | 11/2022 | Wu | | H04L 1/0041 |
| 11,678,307 B2* | 6/2023 | Lee | | H04W 72/12 370/330 |
| 11,791,968 B2* | 10/2023 | Marinier | | H04L 1/1893 370/311 |
| 2007/0254799 A1* | 11/2007 | Kaneda | | H01G 4/30 501/139 |
| 2008/0175194 A1* | 7/2008 | Blanz | | H04W 72/542 370/332 |
| 2010/0303016 A1* | 12/2010 | Jin | | H04L 27/0008 370/328 |
| 2012/0057521 A1* | 3/2012 | Liang | | H04L 1/1893 370/315 |
| 2012/0087271 A1* | 4/2012 | Blanz | | H04J 13/0044 370/252 |
| 2012/0120865 A1* | 5/2012 | Liang | | H04L 5/0053 370/315 |
| 2016/0095094 A1* | 3/2016 | Xu | | H04L 1/00 370/336 |
| 2017/0366328 A1* | 12/2017 | Seo | | H04L 5/0051 |
| 2018/0006791 A1* | 1/2018 | Marinier | | H04L 1/003 |
| 2018/0027534 A1* | 1/2018 | Xu | | H04W 72/0446 370/336 |
| 2019/0045390 A1* | 2/2019 | Davydov | | H04W 28/10 |
| 2019/0081729 A1* | 3/2019 | Salah | | H04L 5/0046 |
| 2020/0137616 A1* | 4/2020 | Davydov | | H04W 28/0273 |
| 2020/0235892 A1* | 7/2020 | Marinier | | H04L 1/1896 |
| 2020/0304231 A1* | 9/2020 | Wu | | H04L 1/0057 |
| 2021/0127377 A1* | 4/2021 | Lee | | H04L 27/2602 |
| 2021/0297225 A1* | 9/2021 | Marinier | | H04W 52/0216 |
| 2021/0367715 A1* | 11/2021 | Sarkis | | H04L 1/1896 |
| 2021/0385822 A1* | 12/2021 | Chae | | H04W 72/0453 |
| 2021/0400683 A1* | 12/2021 | Lin | | H04L 1/1819 |
| 2022/0052822 A1* | 2/2022 | Lin | | H04L 5/0094 |
| 2022/0061041 A1* | 2/2022 | Chen | | H04W 72/20 |
| 2022/0167313 A1* | 5/2022 | Zhou | | H04W 72/20 |
| 2022/0201711 A1* | 6/2022 | Lee | | H04W 72/20 |
| 2022/0210804 A1* | 6/2022 | Hwang | | H04L 5/0053 |
| 2023/0023231 A1* | 1/2023 | Chae | | H04W 72/02 |
| 2023/0033409 A1* | 2/2023 | Lee | | H04W 4/40 |
| 2023/0421331 A1* | 12/2023 | Marinier | | H04W 72/02 |

FOREIGN PATENT DOCUMENTS

| | | | | |
|---|---|---|---|---|
| KR | 20180135868 | | 12/2018 | |
| WO | WO2018199707 | | 11/2018 | |
| WO | WO-2019047980 A1 * | | 3/2019 | ......... H04L 1/0002 |
| WO | WO-2020220853 A1 * | | 11/2020 | ......... H04L 5/0044 |
| WO | WO-2021221363 A1 * | | 11/2021 | ......... H04L 1/0002 |

OTHER PUBLICATIONS

3GPP TS 38.214, "3rd Generation Partnership Project; Technical Specification Group Radio Access Network; NR; Physical layer procedures for data (Release 15)," V15.4.0, dated Dec. 2018, 102 pages.
LG Electronics, "Discussion on resource allocation and TBS determination," R1-1719929, Presented at 3GPP TSG RAN WG1 Meeting 91, Reno, USA, Nov. 27-Dec. 1, 2017, 16 pages.
Intel Corporation, "Sidelink physical layer procedures for NR V2X communication," R1-1900481, Presented at 3GPP TSG RAN WG1 Ad-Hoc Meeting 1901, Taipei, Taiwan, Jan. 21-25, 2019, 17 pages.
Mediatek Inc., "On TBS determination formula," R1-1721611, Presented at 3GPP TSG RAN WG1 Meeting #91, Reno, USA, Nov. 27-Dec. 1, 2017, 9 pages.
MediaTek Inc., "TB size determination and flexible Quantization in NR," R1-1719585, Presented at 3GPP TSG RAN WG1 #91, Reno, Nevada, USA, Nov. 27-Dec. 1, 2017, 10 pages.
Office Action in Korean Appln. No. 10-2021-7027763, dated Nov. 10, 2021, 9 pages (with English translation).
Huawei, HiSilicon, "Discussion on modified MCS table with TBS scaling factor 1," 3GPP TSG RAN WG1 Meeting #92, R1-1801421, Athens, Greece, Feb. 26-Mar. 2, 2018, 4 pages.
LG Electronics, "Correction on Table-based TBS Determination Procedure," 3GPP TSG RAN WG1 Meeting #92, R1-1803230, Athens, Greece, Feb. 26-Mar. 2, 2018, 9 pages.
LG Electronics, "Discussion on resource allocation and TBS determination," 3GPP TSG RAN WG1 Meeting 91, R1-1719929, Reno, USA, Nov. 27-Dec. 1, 2017, 16 pages.
Office Action in Korean Application No. 10-2021-7027763, dated Mar. 18, 2022, 4 pages (with English translation).

* cited by examiner

FIG. 4
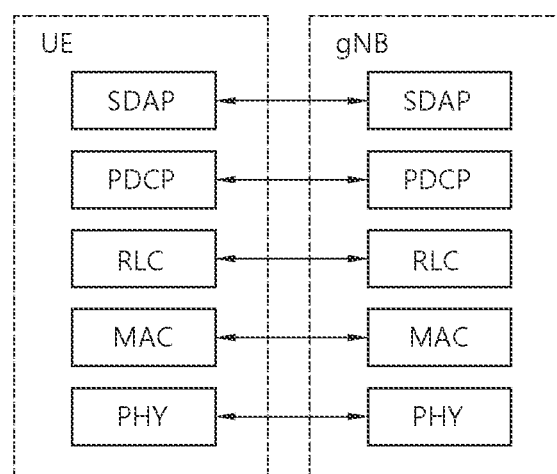
(a)
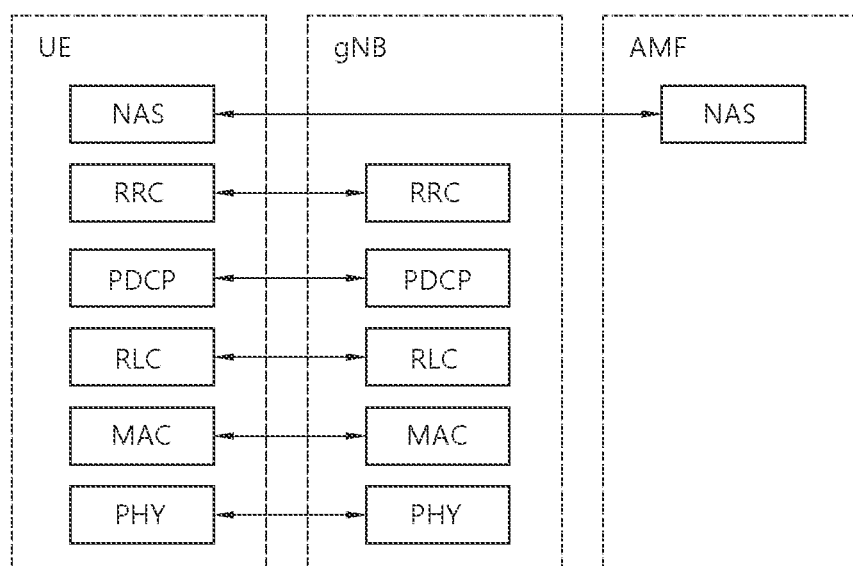
(b)

FIG. 8
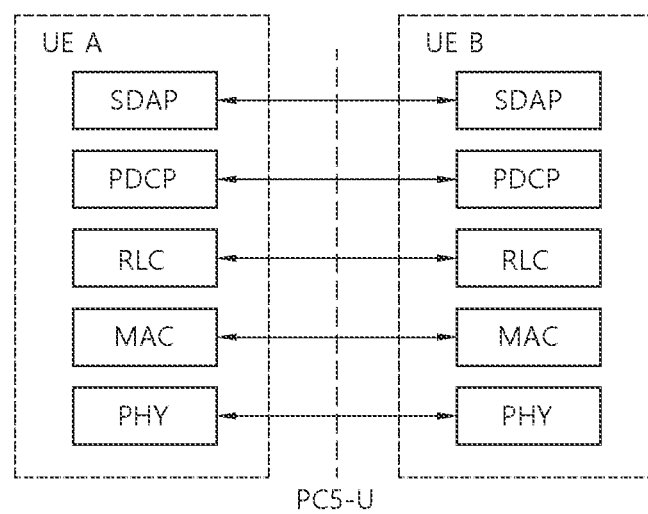
(a)
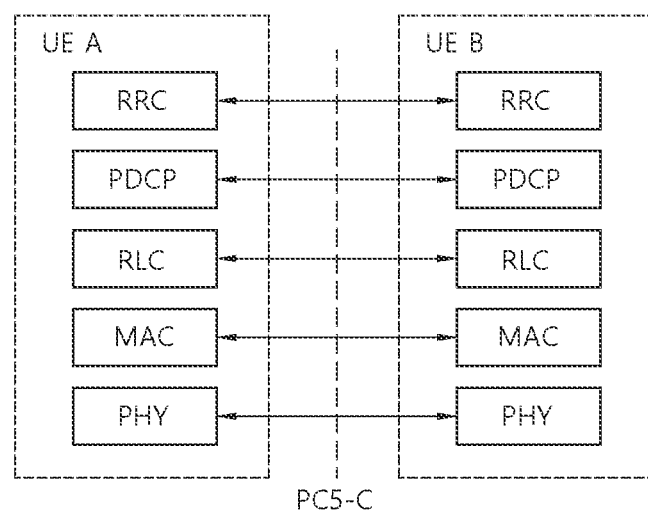
(b)

METHOD AND DEVICE FOR DETERMINING TRANSPORT BLOCK SIZE IN NR V2X

CROSS-REFERENCE TO RELATED APPLICATIONS

This application is a National Stage application under 35 U.S.C. § 371 of International Application No. PCT/KR2020/004379, filed on Mar. 30, 2020, which claims the benefit of U.S. Provisional Application No. 62/826,935, filed on Mar. 29, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, when specific information and/or specific signal(s) is transmitted through some of resources on a data channel, a UE needs to efficiently determine a transport block size (TBS) related to data information transmitted through the data channel.

Technical Solutions

In one embodiment, a method for performing wireless communication by a first device is provided. The method may comprise: determining a number of resource elements (REs) for transport block size (TBS) determination, based on a number of REs in one slot and a number of REs on a physical sidelink control channel (PSCCH) resource in the one slot; obtaining intermediate number related to TBS, by multiplying the number of REs for the TBS determination, a code rate, a modulation order, and a number of layers; quantizing the intermediate number; determining the TBS based on the quantized intermediate number; and performing, to a second device, sidelink (SL) transmission based on the determined TBS, wherein the number of REs for the TBS determination is determined by excluding the number of REs on the PSCCH resource.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: determine a number of resource elements (REs) for transport block size (TBS) determination, based on a number of REs in one slot and a number of REs on a physical sidelink control channel (PSCCH) resource in the one slot; obtain intermediate number related to TBS, by multiplying the number of REs for the TBS determination, a code rate, a modulation order, and a number of layers; quantize the intermediate number; determine the TBS based on the quantized intermediate number; and perform, to a second device, sidelink (SL) transmission based on the determined TBS, wherein the number of REs for the TBS determination is determined by excluding the number of REs on the PSCCH resource.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
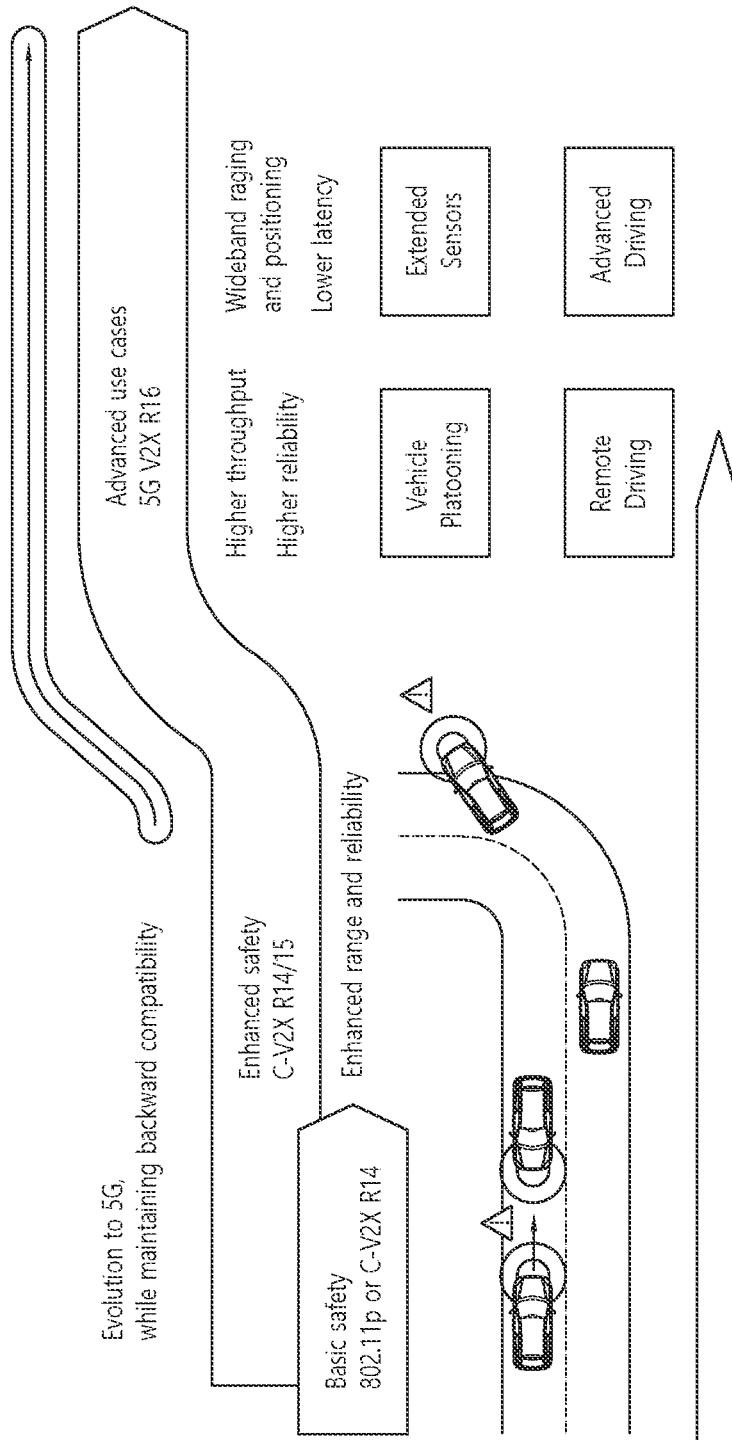
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
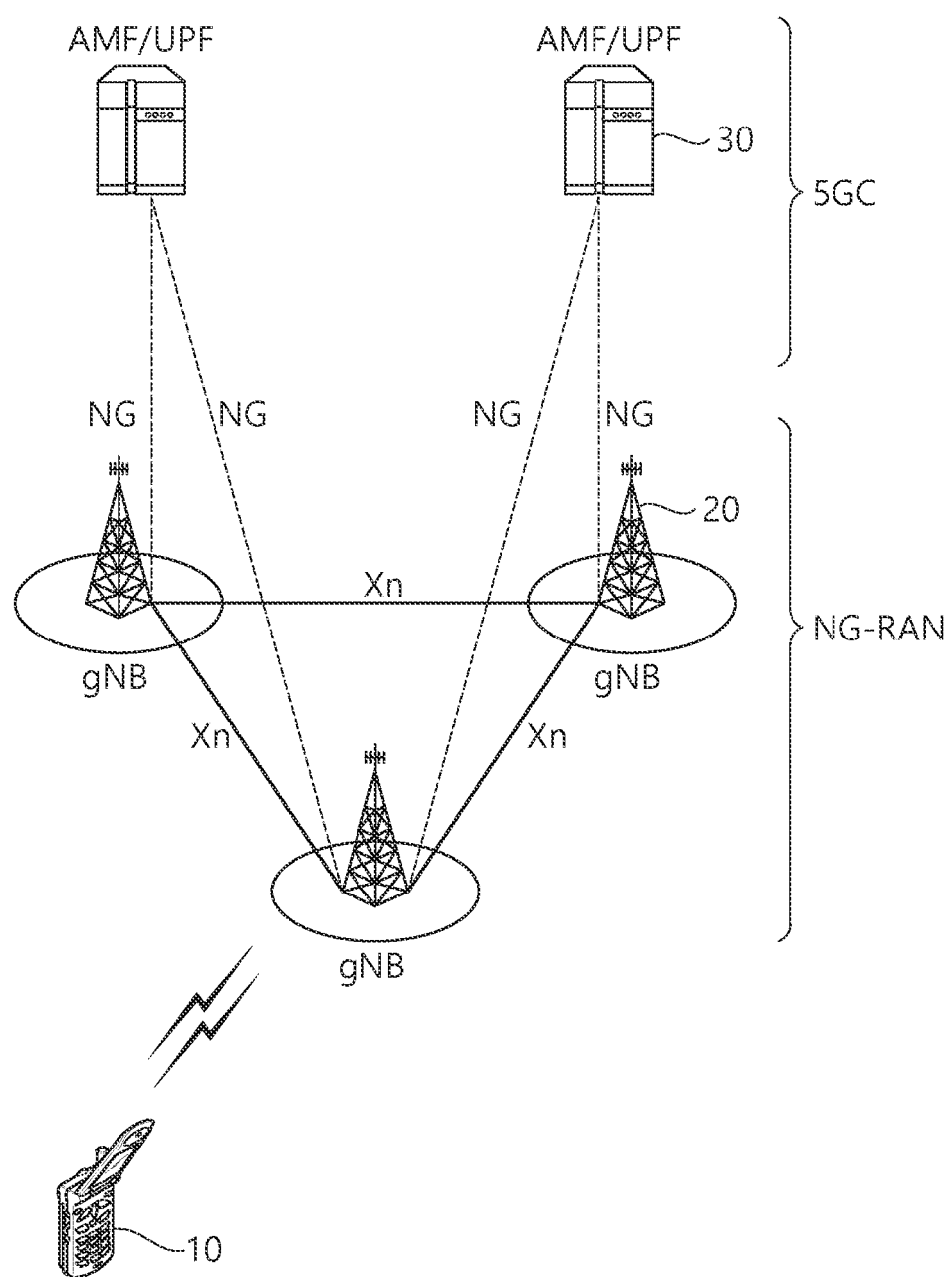
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
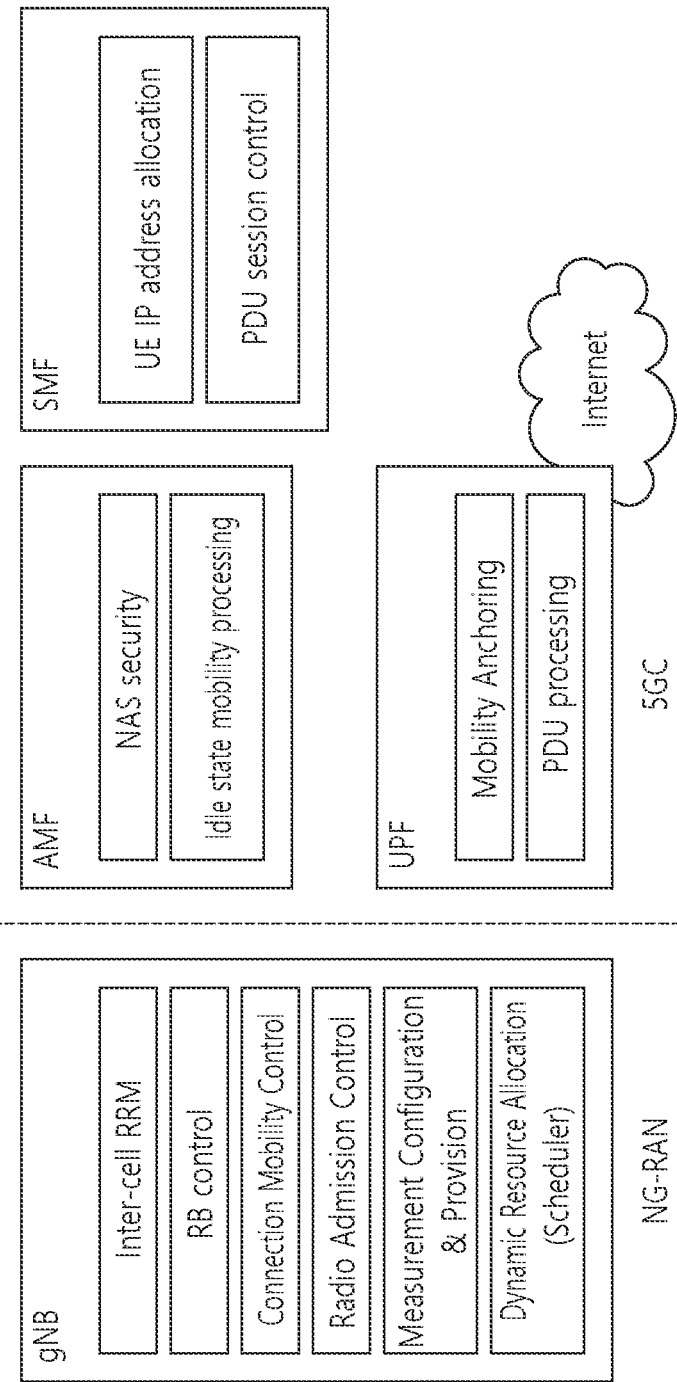
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
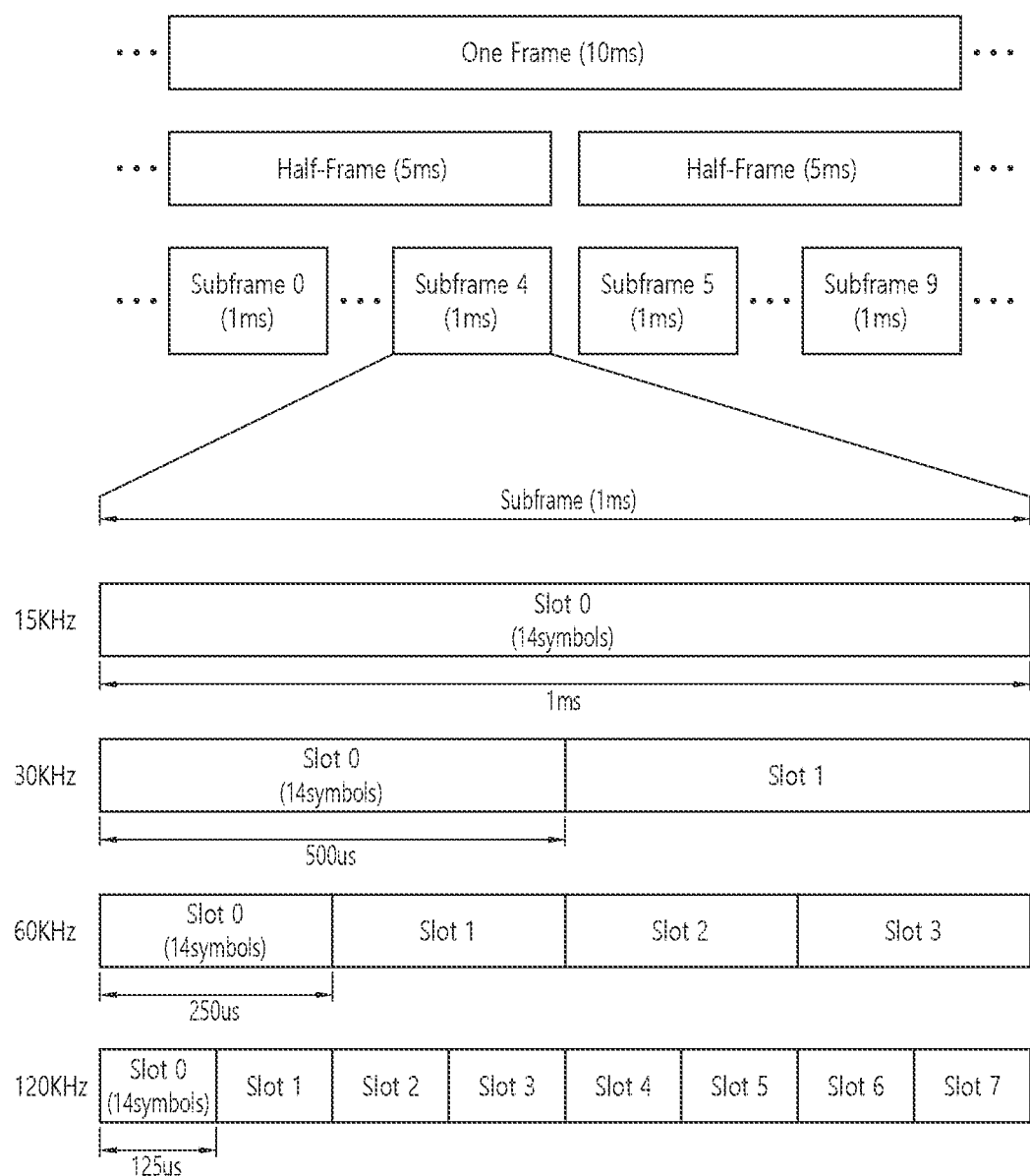
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
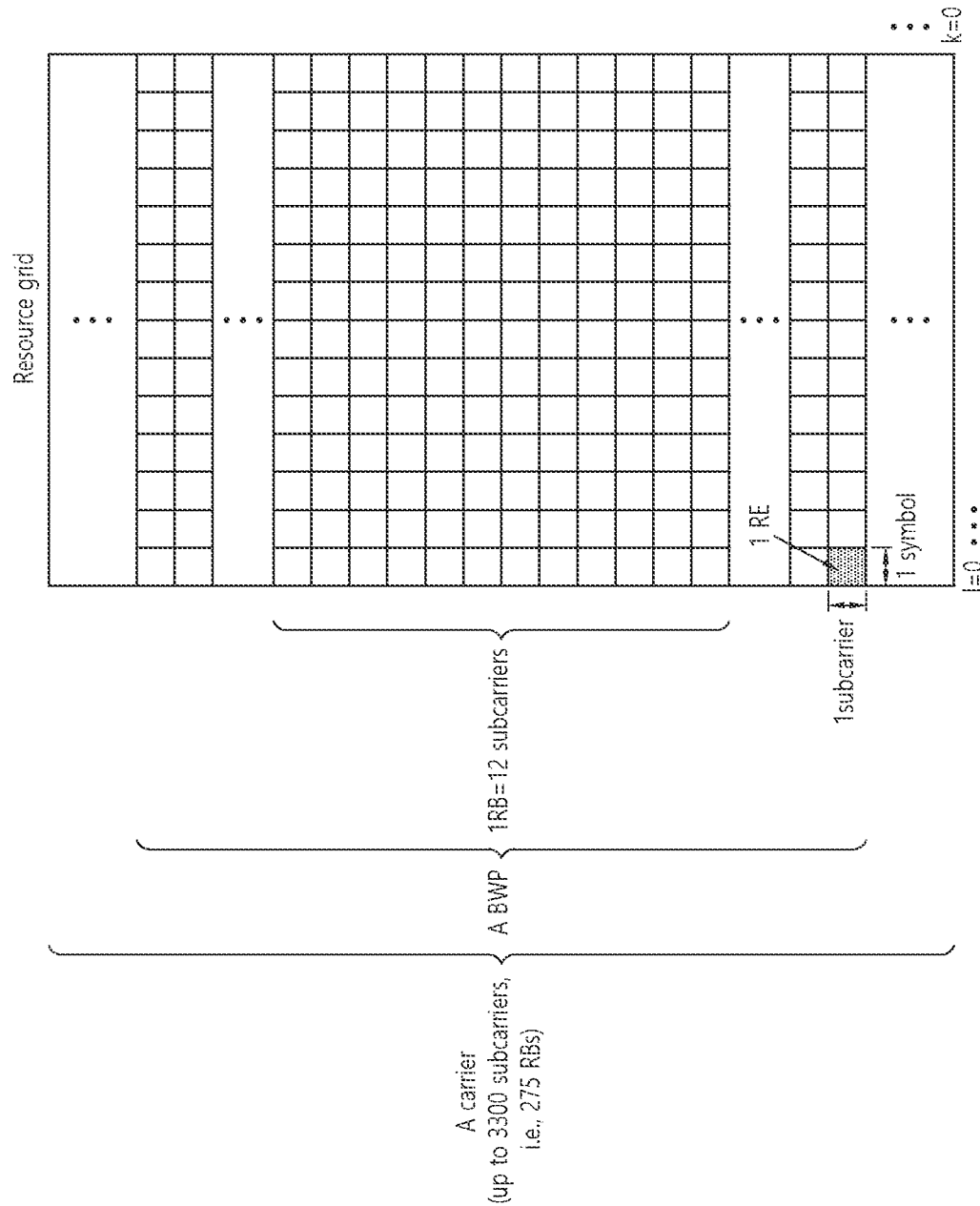
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
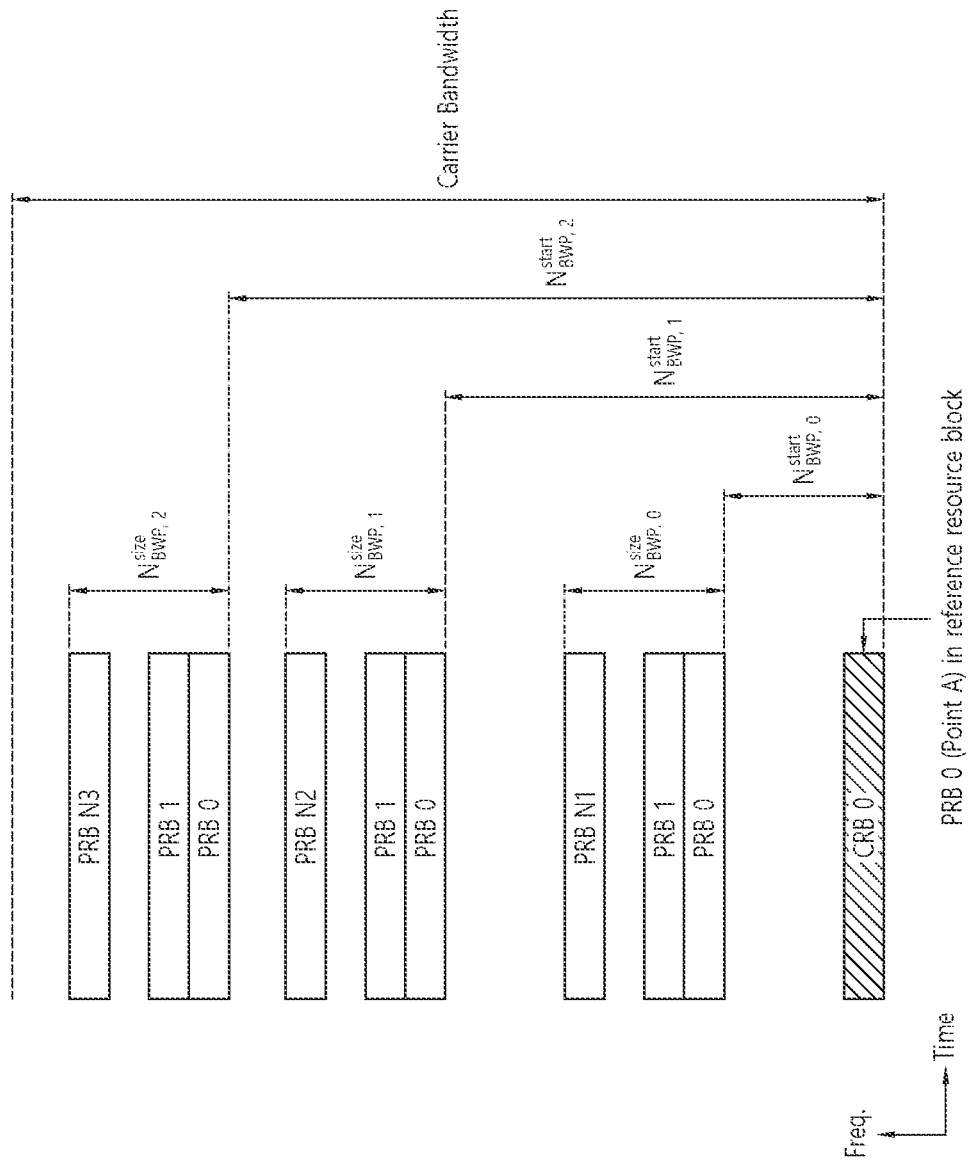
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
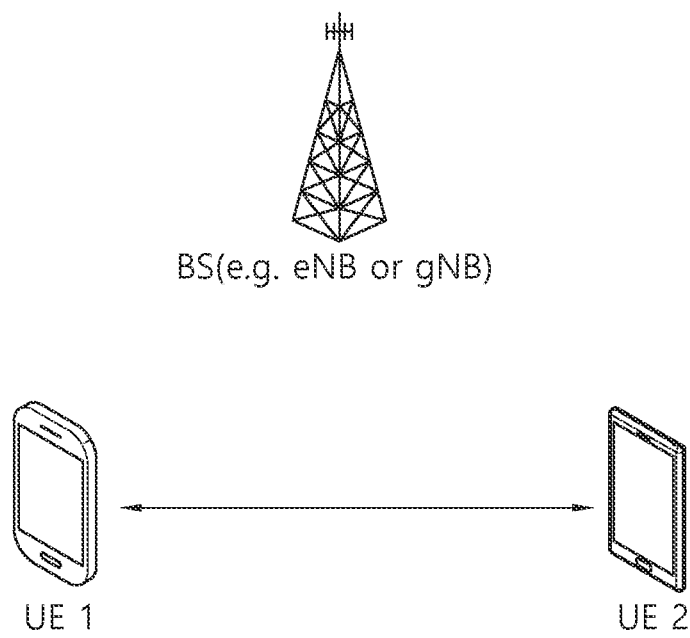
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
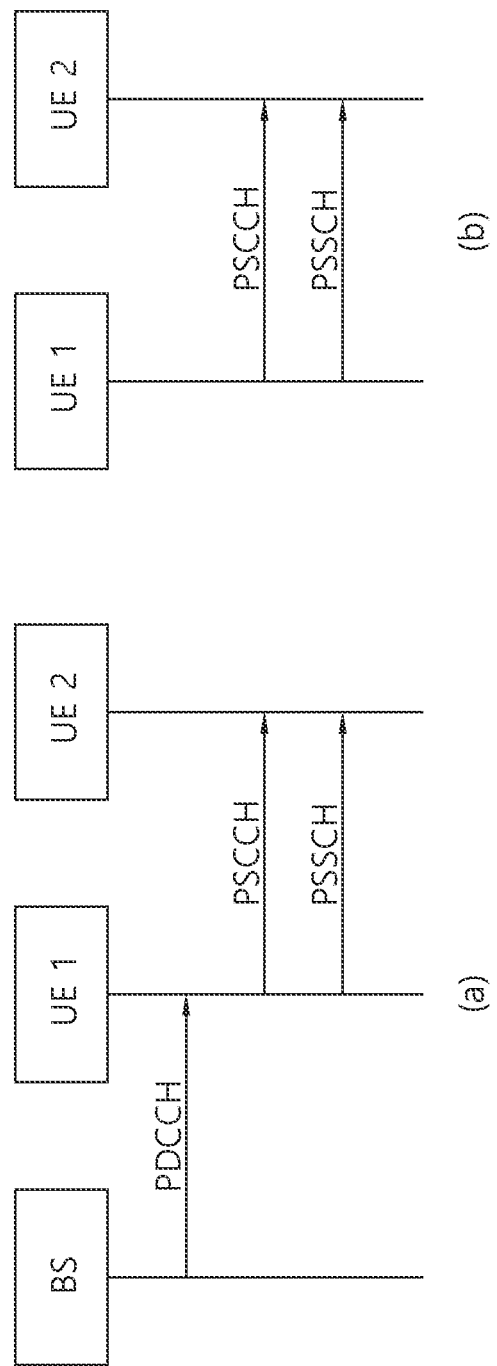
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
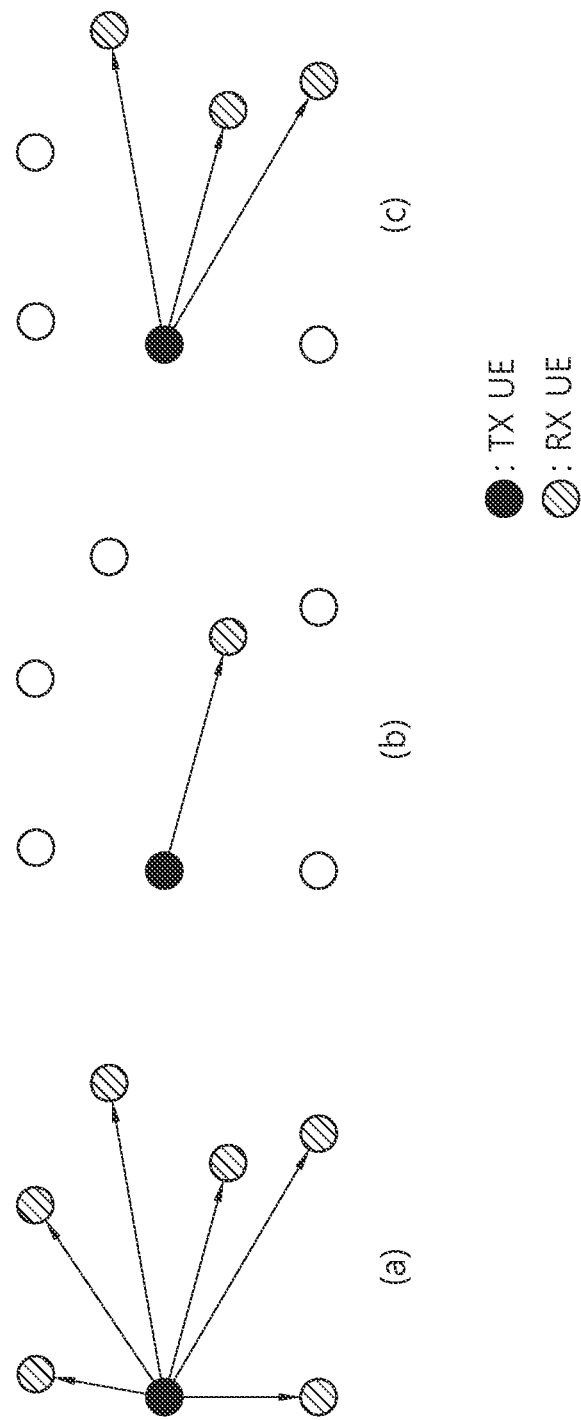
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation coding scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance range) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Meanwhile, in a wireless communication system, data may be transmitted in Transport Block (TB) units. For example, in an uplink, the UE may determine the size of a transport block in accordance with the procedure, which will hereinafter be described in detail.

In an LTE system of the related art, in order to determine a modulation order ($Q_m$) for PUSCH, a redundancy version, and a transport block (TB) size, the UE may read a 'Modulation and Coding Scheme (MCS) and redundancy version' field (hereinafter, referred to as $I_{MCS}$) in a DCI format. And, the UE may check a 'CSI request' field and calculate a total number of allocated PRB-pairs (this is indicated as $N_{PRB}$). Thereafter, the UE may calculate a number of coded symbols of the control information. The PRB-pair may mean that PRBs of each slot are paired and allocated throughout 2 slots. Hereinafter, for simplicity in the description, the PRB-pair may be abbreviated as PRB.

For example, in case the range of $I_{MCS}$ is 0≤IMCS≤28, the modulation order ($Q_m$) may be determined as follows.

If the UE is capable of supporting a 64 quadrature amplitude modulation (64 QAM) in a PUSCH and is not configured, by a high layer, to perform transmission only by quadrature phase shift keying (QPSK) and 16 QAM, the modulation order may be given by $Q'_m$ of Table 5.

TABLE 5

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 3 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

If the UE is not capable of supporting 64 QAM in PUSCH, or if the UE is configured, by the high layer, to perform transmission only by QPSK and 16 QAM, the UE first reads $Q'_m$ by Table 5, and, then, the modulation order $Q_m$ may be configured as min(4, $Q'_m$). min(a, b) indicates a smaller value between a and b. If a 'ttiBundling' parameter, which is being provided by the high layer, is set to be 'true', a resource allocation size may be limited to $N_{PRB} \leq 3$, and the modulation order ($Q_m$) may be set to 2.

The UE may determine a redundancy version ($rv_{idx}$) that is to be used in PUSCH based on $I_{MCS}$ and Table 5.

Additionally, the transport block size may be determined as follows. For example, in case the range of $I_{MCS}$ is $0 \leq IMCS \leq 28$, the UE may first determine a Transport Block Size (TBS) index ($I_{TBS}$) based on $I_{MCS}$ and Table 5. For $1 \leq N_{PRB} \leq 110$, the transport block size may be given as shown in Table 6 in accordance with $I_{TBS}$ and $N_{PRB}$. Herein, Table 6 is a table for $1 \leq N_{PRB} \leq 10$, which indicates only part of $1 \leq N_{PRB} \leq 110$ for simplicity. For the remaining part, i.e., $11 \leq N_{PRB} \leq 110$, $N_{PRB}$ may be given as shown in Table 6.

TABLE 6

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 323 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |

TABLE 6-continued

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

In summary, in the related art LTE system, in order to determine the size of information for MAC Packet Data Unit (PDU) transmission, for example, the UE may perform the above-described TBS determination procedure. That is, a table for determining a TBS may be defined, and parameters for determining a TBS value in the table presented above may be a number of Resource Blocks (RBs) and Modulation and Coding Scheme (MCS), and so on, being allocated to the UE. Therefore, the UE may determine values corresponding to the above-described parameters as transmission TBS in the corresponding TTI. More specifically, in the LTE system, reference may be made to 3GPP TS 36.213 V15.1.0 for the TBS determination method of the UE.

In an NR system, the UE may perform a TBS determination procedure for MAC PDU transmission. Unlike in the LTE system, since flexible TTI and time domain resource allocation are adopted in the NR system, the UE may determine a TBS based on equations and not based on tables. Nevertheless, in case an intermediate number of information bits is less than a specific value (e.g., 3824), the UE may also determine a TBS based on Table 7. More specifically, in the NR system, reference may be made to 3GPP TS 38.214 V15.4.0 for the TBS determination procedure of the UE.

Hereinafter, a procedure for a UE to determine a TBS for communication with a base station in an NR system will be briefly described.

Firstly, in a first phase (or step), the UE may determine a number of REs ($N'_{RE}$) allocated for PUSCH within a single Physical Resource Block (PRB), or the UE may determine a number of REs ($N'_{RE}$) allocated for PDSCH within a single Physical Resource Block (PRB). $N'_{RE}$ may be obtained by Equation 1.

$$N'_{RE} = N_{sc}^{RB} \cdot N_{symb}^{sh} - N_{DMRS}^{PRB} - N_{oh}^{PRB} \quad \text{[Equation 1]}$$

Herein, $N^{RB}_{sc}$ may be a number of subcarriers within a frequency domain within a PRB. For example, $N^{RB}_{sc}$ may be equal to 12. For example, in the case of TBS determination for PUSCH, $N^{sh}_{symb}$ may be a number of symbols of PUSCH allocation within a slot. For example, in the case of TBS determination for PDSCH, $N^{sh}_{symb}$ may be a number of symbols of PDSCH allocation within a slot. For example, $N^{PRB}_{DMRS}$ may be a number of Resource Elements (REs) for DM-RS(s) per a PRB during an allocated duration or a scheduled duration including an overhead of a DM-RS CDM group. $N^{PRB}_{oh}$ may be an overhead being configured by a high layer parameter. If a high layer parameter is not configured, $N^{PRB}_{oh}$ may be assumed to be equal to 0.

Thereafter, in a second phase (or step), the UE may determine a total number of REs ($N_{RE}$) being allocated for PUSCH, or the UE may determine a total number of REs ($N_{RE}$) being allocated for PDSCH. $N_{RE}$ may be obtained by Equation 2.

$$N_{RE}=\min(156,N'_{RE})\cdot n_{PRB} \quad \text{[Equation 2]}$$

Herein, $n_{PRB}$ may be a total number of PRBs being allocated for the UE. That is, the UE may obtain $N_{RE}$ by multiplying a smaller number between $N'_{RE}$ and 156 by $n_{PRB}$.

Then, in a third phase (or step), the UE may obtain an intermediate number of information bits ($N_{info}$). $N_{info}$ may be obtained by Equation 3.

$$N_{info}=N_{RE}\cdot R\cdot Q_m\cdot v \quad \text{[Equation 3]}$$

Herein, R may be a code rate, and $Q_m$ may be a modulation order. v may be a number of layers.

Figure 12:
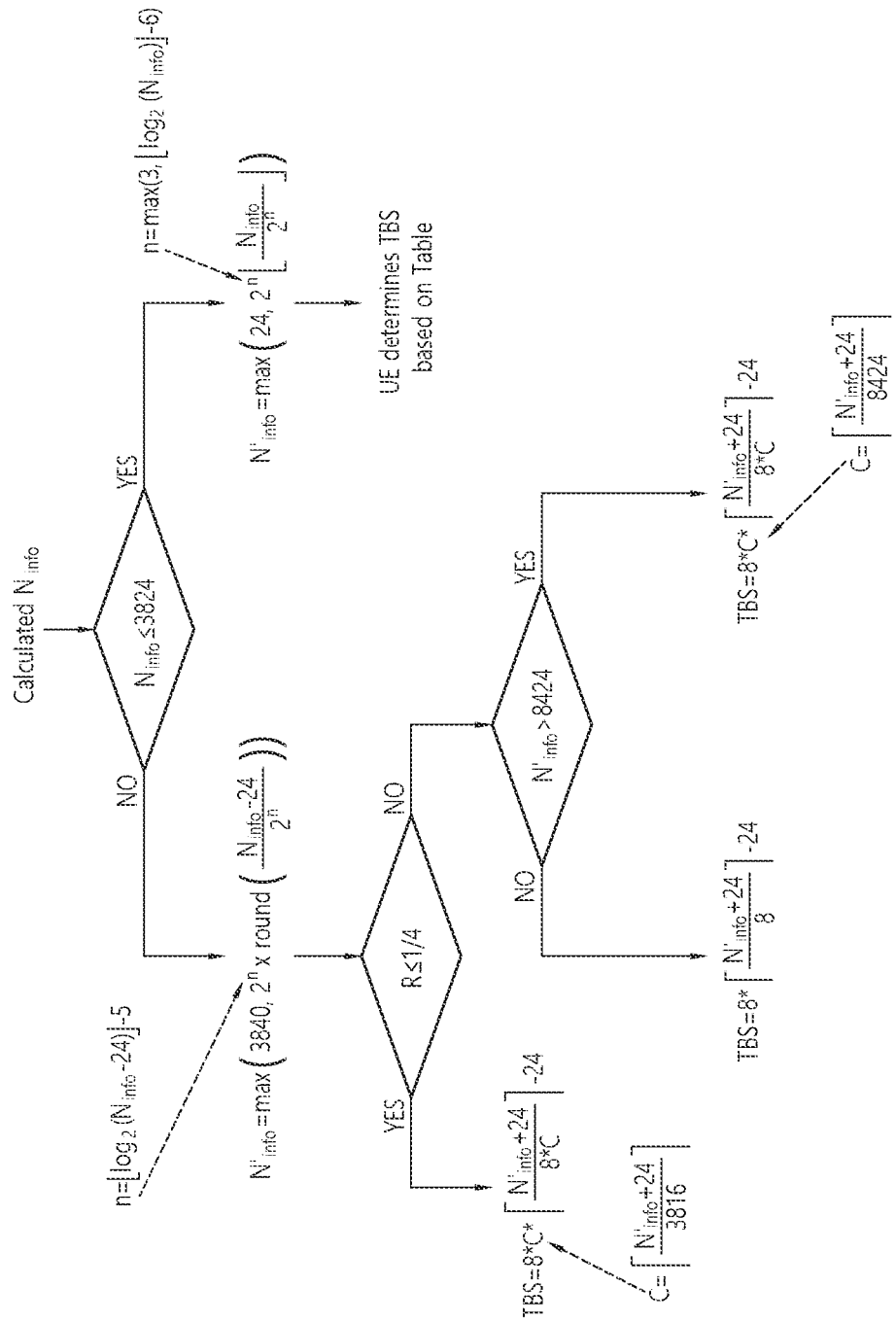
FIG. 12 shows a flowchart for TBS determination, based on an embodiment of the present disclosure.

Finally, in a fourth phase (or step), based on a calculated $N_{info}$, the UE may determine a TBS according to the procedure shown in FIG. 12.

FIG. 12 shows a flowchart for TBS determination, based on an embodiment of the present disclosure. The embodiment of FIG. 12 may be combined with various embodiments of the present disclosure.

In case $N_{info}$ is equal to 3824 or less, the UE may determine the TBS based on Table 7.

TABLE 7

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Meanwhile, in the case of the NR SL, a transmitting UE may transmit specific information and/or specific signal(s) to a receiving UE, by using some of resources on a data channel (e.g., PSSCH). For example, the specific information may include at least one of control information, channel state information, measurement information, and/or HARQ feedback information. For example, the specific signal(s) may be reference signal(s). For example, some of the resources may be some of time resources and/or some of frequency resources. For example, some of the resources may be resource(s) pre-configured for the transmitting UE and/or the receiving UE. Herein, for example, it may be assumed that data information is transmitted through the remaining resources except for some of the resources. The specific information and/or the specific signal(s) may include at least one of the following information and/or signal(s).

Reference signal(s) for SL channel measurement: For example, reference signal(s) for SL channel measurement may be reference signal(s) for SL channel/interference estimation, SL-RSRP measurement, SL-RSRQ measurement and/or SL-RSSI measurement, etc. For example, reference signal(s) for SL channel measurement may be referred to as various terms such as M-RS, SL M-RS, or SL RS, etc.

Demodulation RS (DM-RS): For example, DM-RS(s) may be used for channel estimation for decoding information on a PSSCH.

Sidelink channel state information (SL CSI): For example, SL CSI may include at least one of a rank indicator (RI), a channel quality indicator (CQI), or a precoding matrix indicator (PMI).

SL measurement information (SL MI): For example, SL MI may include at least one of SL-RSRP, SL-RSRQ, or SL-RSSI.

Sidelink HARQ feedback information

Sidelink control information: For example, sidelink control information transmitted through some of resources on the data channel may be a SCI. In order to distinguish it from a SCI transmitted through a PSCCH, in the present disclosure, the SCI transmitted through some of resources on the data channel may be referred to as a second SCI or a 2nd SCI. For example, the 2nd SCI may include at least one of PSSCH (time/frequency) resource information, information required for PSSCH detection/decoding (e.g., MCS value, the number of layers), or information required for HARQ combining (in a PHY layer). For example, the information required for HARQ combining may include at least one of a redundancy version (RV), a new data indicator (NDI), a HARQ process ID, (L1) source ID, or (L1) destination ID.

Meanwhile, if the specific information and/or the specific signal(s) is transmitted based on some of resources on a data channel, a UE needs to efficiently determine a transport block size (TBS) related to data information transmitted through the data channel. Hereinafter, based on various embodiments of the present disclosure, a method for a UE to determine a TBS in NR V2X and an apparatus supporting the same will be described.

Figure 13:
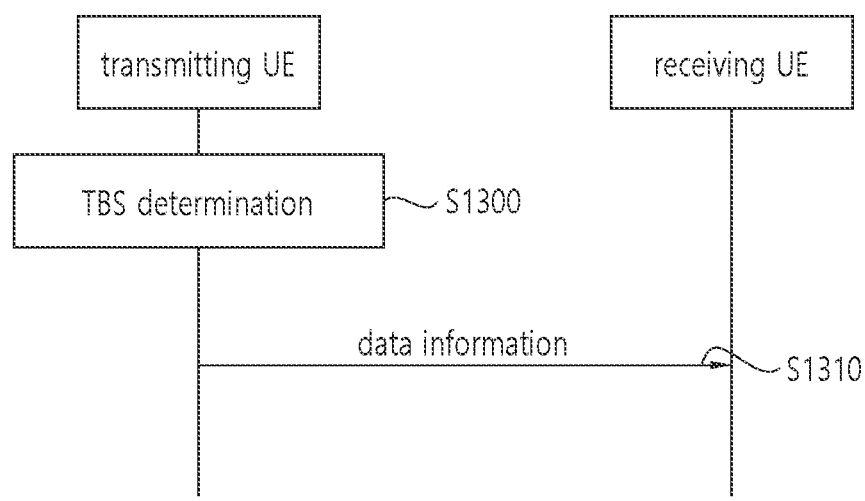
FIG. 13 shows a procedure in which a transmitting UE, which has determined TBS, transmits data information to a receiving UE, based on an embodiment of the present disclosure.

FIG. 13 shows a procedure in which a transmitting UE, which has determined TBS, transmits data information to a receiving UE, based on an embodiment of the present disclosure. The embodiment of FIG. 13 may be combined with various embodiments of the present disclosure.

Referring to FIG. 13, in step S1300, a UE may determine a TBS. For example, the TBS may be related to data information transmitted through a PSSCH. For example, the UE may determine the TBS by considering only data information transmitted through the PSSCH. For example, the TBS may not be related to the specific information and/or the specific signal(s) transmitted through the PSSCH. For example, the UE may determine the TBS without considering the specific information transmitted through the PSSCH. For example, the UE may determine the TBS without considering the specific signal(s) transmitted through the PSSCH.

Specifically, first, the UE may determine the number of reference resource elements (REs). For example, the UE may determine the number of reference resource elements (REs) based on Equations 4 to 8. Herein, for example, $N^{sh}_{symb}$ may be the number of symbols allocated for the PSCCH and/or the PSSCH in a slot. For example, $N^{sh}_{symb}$ may be the number of symbols allocated for the PSSCH in a slot. A specific method for the UE to determine the number of reference REs will be described later.

In addition, the UE may obtain a TBS-related intermediate number based on at least one of the number of reference REs, a code rate, a modulation order, and/or the number of layers. For example, the UE may obtain the TBS-related intermediate number by multiplying the number of reference REs, the code rate, the modulation order, and/or the number of layers. For example, the TBS-related intermediate number may be an intermediate number of information bits. In addition, the UE may perform a quantization process for the TBS-related intermediate number. In addition, the UE may determine a final TBS based on the quantized TBS-related intermediate number.

Additionally, for example, in the process of the UE obtaining the TBS-related intermediate number, the UE may additionally multiply the TBS-related intermediate number by a scaling factor. For example, the scaling factor may be configured for the UE (partially or fully) differently, based on a service type, a service priority, or a service requirement (e.g., service reliability or service latency). For example, the scaling factor may be configured for the UE (partially or fully) differently based on the number of symbols in a slot in which the PSSCH can be transmitted.

In the present disclosure, the PSCCH may be extended to refer to the SCI. For example, the PSSCH scheduled by the PSCCH may mean the PSSCH scheduled by the SCI.

In addition, whether or not to apply the method/rule proposed according to various embodiments of the present disclosure may be configured for the UE (partially or fully) differently for each service type, service priority, or service requirement.

Based on an embodiment of the present disclosure, the UE may determine or obtain the number of the reference REs based on (some) rules proposed below.

For example, the number of reference REs may be the number of REs to which data information is actually mapped in the PSSCH. In this case, since the UE can determine a TBS based on only the number of REs to which data information is actually mapped in the PSSCH, an ideal TBS can be derived. Accordingly, a code rate may be reduced, and transmission efficiency of data information may be increased. However, if a receiving UE fails to receive control information and/or data information initially transmitted by a transmitting UE, it may be difficult for the receiving UE to determine a TBS related to data information retransmitted by the transmitting UE.

For example, the number of reference REs may be the number of REs including time resource(s) or frequency resource(s) of a PSSCH scheduled by a PSCCH. In this case, the UE may determine a TBS based on the number of REs to which the specific information and/or the specific signal(s) is mapped as well as the number of REs to which data information is actually mapped in the PSSCH. Thus, a non-ideal TBS may be derived. For example, the UE may determine a TBS to be larger than an actual required TBS. Accordingly, a code rate may increase, and transmission efficiency of data information may decrease. However, if a receiving UE fails to receive control information and/or data information initially transmitted by a transmitting UE, the receiving UE can easily determine a TBS related to data information retransmitted by the transmitting UE. For example, if frequency resource(s) and time resource(s) of initial transmission and retransmission are the same, even if the receiving UE fails to receive control information and/or data information initially transmitted by the transmitting UE, the receiving UE can easily determine a TBS related to data information retransmitted by the transmitting UE.

For example, the number of reference REs may be the number of remaining REs after excluding at least one of RE(s) for M-RS(s), RE(s) for DM-RS(s), RE(s) for SL CSI, RE(s) for SL MI, RE(s) for SL HARQ (e.g., PSFCH), RE(s) for a 2nd SCI and/or RE(s) for a PSCCH from time resource(s) or frequency resource(s) of a PSSCH scheduled by the PSCCH. For example, the number of reference REs may be the number of remaining REs after excluding RE(s) to which M-RS(s) is mapped from time resource(s) or frequency resource(s) of a PSSCH scheduled by a PSCCH. For example, the number of reference REs may be the number of remaining REs after excluding RE(s) to which DM-RS(s) is mapped from time resource(s) or frequency resource(s) of a PSSCH scheduled by a PSCCH. For example, the number of reference REs may be the number of remaining REs after excluding RE(s) to which SL CSI is mapped from time resource(s) or frequency resource(s) of a PSSCH scheduled by a PSCCH. For example, the number of reference REs may be the number of remaining REs after excluding RE(s) to which SL MI is mapped from time resource(s) or frequency resource(s) of a PSSCH scheduled by a PSCCH. For example, the number of reference REs may be the number of remaining REs after excluding RE(s) to which SL HARQ information is mapped from time resource(s) or frequency resource(s) of a PSSCH scheduled by a PSCCH. For example, the number of reference REs may be the number of remaining REs after excluding RE(s) to which a 2nd SCI is mapped from time resource(s) or frequency resource(s) of a PSSCH scheduled by a PSCCH. For example, the number of reference REs may be the number of remaining REs after excluding RE(s) for a PSCCH from time resource(s) or frequency resource(s) of a PSSCH scheduled by the PSCCH. In this case, the UE may determine a TBS based on the number of REs to which some of specific information and/or some of specific signal(s) is mapped as well as the number of REs to which data information is actually mapped in the PSSCH. For example, the UE may determine a TBS based on the number of REs to which specific information that exists semi-statically and/or specific signal(s) that exists semi-statically is mapped as well as the number of REs to which data information is actually mapped in the PSSCH. Alternatively, for example, the UE may determine a TBS by excluding the number of REs to which specific information and/or specific signal(s) that exists semi-statically is mapped. For example, the UE may not consider the number of REs to which specific information in which existence is dynamically changed and/or specific signal(s) in which existence is dynamically changed is mapped, when the UE determines a TBS. This method may be a compromise between the two methods proposed above. For example, the number of reference REs may be the number of remaining REs after excluding REs for DM-RS(s), a PSCCH, and a 2nd SCI from time resource(s) or frequency resource(s) of a PSSCH scheduled by the PSCCH. For example, in the case of the PSCCH and the 2nd SCI, since the number of REs occupied by the PSCCH and the 2nd SCI may change for each transmission of the UE, in order for the UE to indicate the same TBS between initial transmission and retransmission, it may be assumed that the PSCCH relates to a specific aggregation level (AL) value. In addition, it may be assumed that the 2nd SCI is a specific format, the 2nd SCI has a specific (or pre-configured) payload size value, the 2nd SCI has the largest (or smallest, average, or pre-configured) payload size value among 2nd SCI formats, or the largest (or smallest, average, or pre-configured) value among beta offsets for determining the number of REs related to 2nd SCI mapping is applied to the 2nd SCI. For example, in order for the UE to indicate the same TBS between initial transmission and retransmission, the UE may determine that the PSCCH has a specific aggregation level value, and the UE may determine that the 2nd SCI is a specific format or has a specific payload size value. If it is assumed that the PSCCH and the 2nd SCI are specific values, for example, the amount of resources occupied by a 2nd SCI and/or an AL value used for actual PSCCH transmission may be different from the amount of resources occupied by a 2nd SCI and/or an AL value used by the UE to determine a TBS. In addition, for example, in order to maintain the same TBS size between initial transmission and retransmission, a beta offset value related to a 2nd SCI that can be changed between initial transmission and retransmission may be limited.

Based on an embodiment of the present disclosure, time resource(s) or frequency resource(s) of the PSSCH scheduled by the PSCCH may be determined or defined according to (some) rules proposed below.

For example, time resource(s) or frequency resource(s) of the PSSCH scheduled by the PSCCH may be the number of symbols, the number of RBs, or the number of sub-channels actually used by the UE for PSSCH transmission.

For example, time resource(s) or frequency resource(s) of the PSSCH scheduled by the PSCCH may be the number of reference symbols, the number of reference RBs, or the number of reference sub-channels (pre-)configured by a base station or a network for the UE.

For example, time resource(s) or frequency resource(s) of the PSSCH scheduled by the PSCCH may be the minimum number of symbols in a slot, the minimum number of RBs, or the minimum number of sub-channels in which the UE can transmit the PSSCH in a resource pool. For example, a base station may transmit, to a UE, information related to the minimum number of symbols in a slot, the minimum number of RBs, or the minimum number of sub-channels in which the UE can transmit the PSSCH in a resource pool. For example, the symbol in the slot in which the UE can transmit the PSSCH in the resource pool may not include symbol(s) related to a PSFCH and/or symbol(s) related to a PSCCH.

For example, time resource(s) or frequency resource(s) of the PSSCH scheduled by the PSCCH may be the maximum number of symbols in a slot, the maximum number of RBs, or the maximum number of sub-channels in which the UE can transmit the PSSCH in a resource pool. For example, a base station may transmit, to a UE, information related to the maximum number of symbols in a slot, the maximum number of RBs, or the maximum number of sub-channels in which the UE can transmit the PSSCH in a resource pool. For example, the symbol in the slot in which the UE can transmit the PSSCH in the resource pool may not include symbol(s) related to a PSFCH and/or symbol(s) related to a PSCCH.

For example, time resource(s) or frequency resource(s) of the PSSCH scheduled by the PSCCH may be the number of symbols, the number of RBs, or the number of sub-channels used for transmission of the PSSCH corresponding to initial transmission for the same TB indicated by the PSCCH. For example, if the UE determines a TBS related to initial transmission based on N PSSCH symbols, the UE may determine a TBS related to retransmission based on N PSSCH symbols. Specifically, for example, regardless of the number of symbols for an actual PSSCH included in initial transmission resource(s) and retransmission resource(s), the UE may determine a TBS related to retransmission based on the number of symbols used to determine a TBS related to initial transmission. For example, regardless of the number of RBs for an actual PSSCH included in initial transmission resource(s) and retransmission resource(s), the UE may determine a TBS related to retransmission based on the number of RBs used to determine a TBS related to initial transmission. For example, regardless of the number of sub-channels for an actual PSSCH included in initial transmission resource(s) and retransmission resource(s), the UE may determine a TBS related to retransmission based on the number of sub-channels used to determine a TBS related to initial transmission.

Based on an embodiment of the present disclosure, a basic resource unit on a frequency axis from which the number of reference REs is derived may be determined or defined according to (some) rules proposed below. For example, a base station may configure or pre-configure, to a UE, the basic resource unit on the frequency axis from which the number of REs is derived. For example, the basic resource unit on the frequency axis from which the number of REs is derived may be pre-defined for a system (e.g., a UE). For example, a UE may determine the basic resource unit on the frequency axis from which the number of REs is derived according to a pre-configured rule.

For example, if the basic resource unit on the frequency axis is an RB, the UE may determine the number of reference REs per an RB (or for a pre-configured number of RBs), and the UE may determine or obtain the total number of reference REs by multiplying the determined number of reference REs by the total number of RBs allocated for the PSSCH.

For example, if the basic resource unit on the frequency axis is a sub-channel, the UE may determine the number of reference REs per a sub-channel (or for a pre-configured number of sub-channels), and the UE may determine or obtain the total number of reference REs by multiplying the determined number of reference REs by the total number of sub-channels allocated for the PSSCH.

For example, if the basic resource unit on the frequency axis is all sub-channels allocated for the PSSCH, the UE may determine or obtain the total number of reference REs for all the sub-channels allocated for the PSSCH.

Figure 14:
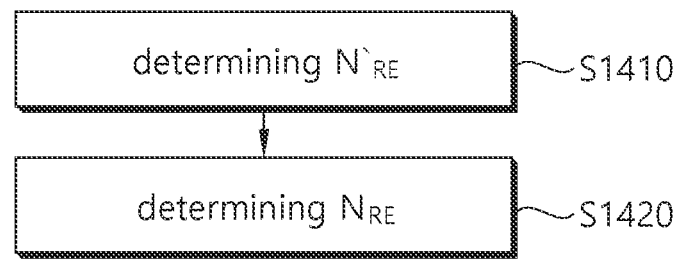
FIG. 14 shows a procedure for a UE to determine the number of reference REs, based on an embodiment of the present disclosure.

FIG. 14 shows a procedure for a UE to determine the number of reference REs, based on an embodiment of the present disclosure. The embodiment of FIG. 14 may be combined with various embodiments of the present disclosure.

Referring to FIG. 14, in step S1410, a UE may determine the number of REs ($N'_{RE}$) allocated for a PSCCH and a PSSCH in one physical resource block (PRB). For example, $N'_{RE}$ may be obtained by Equation 4, Equation 5, Equation 6, or Equation 7.

$$N'_{RE} = N_{sc}^{RB} \cdot N_{symb}^{sh} - N_{oh}^{PRB}$$ [Equation 4]

$$N'_{RE} = N_{sc}^{RB} \cdot N_{symb}^{sh} - N_{DMRS}^{PRB} - N_{oh}^{PRB}$$ [Equation 5]

$$N'_{RE} = N_{sc}^{RB} \cdot (N_{symb}^{sh} - N_{symb}^{PSFCH}) - N_{oh}^{PRB}$$ [Equation 6]

$$N'_{RE} = N_{sc}^{RB} \cdot (N_{symb}^{sh} - N_{symb}^{PSFCH}) - N_{DMRS}^{PRB} - N_{oh}^{PRB}$$ [Equation 7]

Herein, $N^{RB}_{sc}$ may be the number of subcarriers in a frequency domain in a PRB. For example, $N^{RB}_{sc}$ may be 12. For example, $N^{sh}_{symb}$ may be the number of symbols allocated for the PSCCH and the PSSCH within the slot. For example, $N^{PRB}_{oh}$ may be an overhead configured by a higher layer parameter. If the higher layer parameter is not configured, $N^{PRB}_{oh}$ may be assumed to be 0. For example, $N^{PSFCH}_{symb}$ may be the number of symbols allocated for a PSFCH within the slot. For example, $N^{PSFCH}_{symb}$ may be an pre-configured overhead related to a PSFCH. That is, in this case, regardless of the number of symbols actually allocated for the PSFCH within the slot, the UE may determine the number of REs ($N'_{RE}$) based on $N^{PSFCH}_{symb}$. For example, if a first resource pool includes PSFCH resource(s), a UE performing SL communication on the first resource pool may determine the number of REs ($N'_{RE}$) based on $N^{PSFCH}_{symb}$. For example, if a second resource pool does not include PSFCH resource(s), a UE performing SL communication on the second resource pool may not use $N^{PSFCH}_{symb}$ to determine the number of REs ($N'_{RE}$).

For example, $N^{PRB}_{DMRS}$ may be a number of Resource Elements (REs) for DM-RS(s) per a PRB during an allocated duration or a scheduled duration including an overhead of a DM-RS CDM group.

For example, symbol(s) allocated for the PSSCH within the slot may not include an automatic gain control (AGC) symbol and/or a guard period (GP) symbol located at the end of the slot. For example, the number of AGC symbols and/or GP symbols located at the end of the slot may be excluded from the number of symbols allocated for the PSSCH within the slot. For example, if the number of symbols allocated for the PSCCH within the slot is 3, and the number of symbols allocated for the PSSCH within the slot is 11, and the last one symbol of the slot is a GP symbol or an AGC symbol, $N^{sh}_{symb}$ may be 13 (i.e., 3+11−1=13). Herein, the AGC symbol may be a symbol duration required for the UE to perform AGC, and the GP symbol may be a symbol duration required for the UE to perform TX/RX switching.

Additionally, for example, at least one of resource(s) related to a 2nd SCI, PSFCH resource(s), a GP symbol before PSFCH resource(s), resource(s) related to SL PT-RS(s), and/or resource(s) related to SL CSI-RS(s) may not be considered in determining the number of REs ($N'_{RE}$) allocated for the PSCCH and the PSSCH. For example, the number of GP symbols before PSFCH resource(s) located in the slot may be excluded from the number of symbols allocated for the PSSCH within the slot.

In step S1420, the UE may determine the number of reference REs ($N_{RE}$). For example, the UE may determine the total number of REs allocated for the PSSCH ($N_{RE}$). $N_{RE}$ may be obtained by Equation 8.

$$N_{RE} = \min(156, N'_{RE}) \cdot n_{PRB} - N_{PSCCH}$$ [Equation 8]

Here, $n_{PRB}$ may be the total number of PRBs allocated for the UE. $N_{PSCCH}$ may be the correct (or actual) number of REs for the PSCCH. For example, $N_{PSCCH}$ may be the number of REs for the PSCCH in the total PRB allocated for the UE. For example, the number of REs for the PSCCH may include the number of REs to which DM-RS(s) transmitted through the PSCCH (i.e., PSCCH DM-RS(s)) is mapped. For example, REs for the PSCCH may include REs to which control information transmitted through the PSCCH is mapped and REs to which DM-RS(s) transmitted through the PSCCH (i.e., PSCCH DM-RS(s)) is mapped. That is, the UE may determine the number of reference REs by subtracting the number of REs related to the PSCCH from a value obtained by multiplying the smallest number among $N'_{RE}$ and 156 by $n_{PRB}$.

Additionally, for example, at least one of resource(s) related to a 2nd SCI, PSFCH resource(s), a GP symbol before PSFCH resource(s), resource(s) related to SL PT-RS(s), and/or resource(s) related to SL CSI-RS(s) may not be considered in determining the number of reference REs ($N_{RE}$).

Based on an embodiment of the present disclosure, the number of REs for the PSCCH may be considered in Equation 8 instead of Equations 4 to 7. Therefore, the UE can more accurately determine a TBS by excluding the overhead related to the PSSCH. Accordingly, when PSCCH resource(s) is allocated in the form of being surrounded by PSSCH resource(s), the UE can more accurately determine the TBS.

Referring back to FIG. 13, in step S1310, the UE may transmit data information to other UE(s) (e.g., receiving UE(s)) based on the determined TBS.

Based on an embodiment of the present disclosure, when specific information and/or specific signal(s) is transmitted through some of resources on a data channel, a UE can efficiently determine a TBS related to data information transmitted through the data channel.

Figure 15:
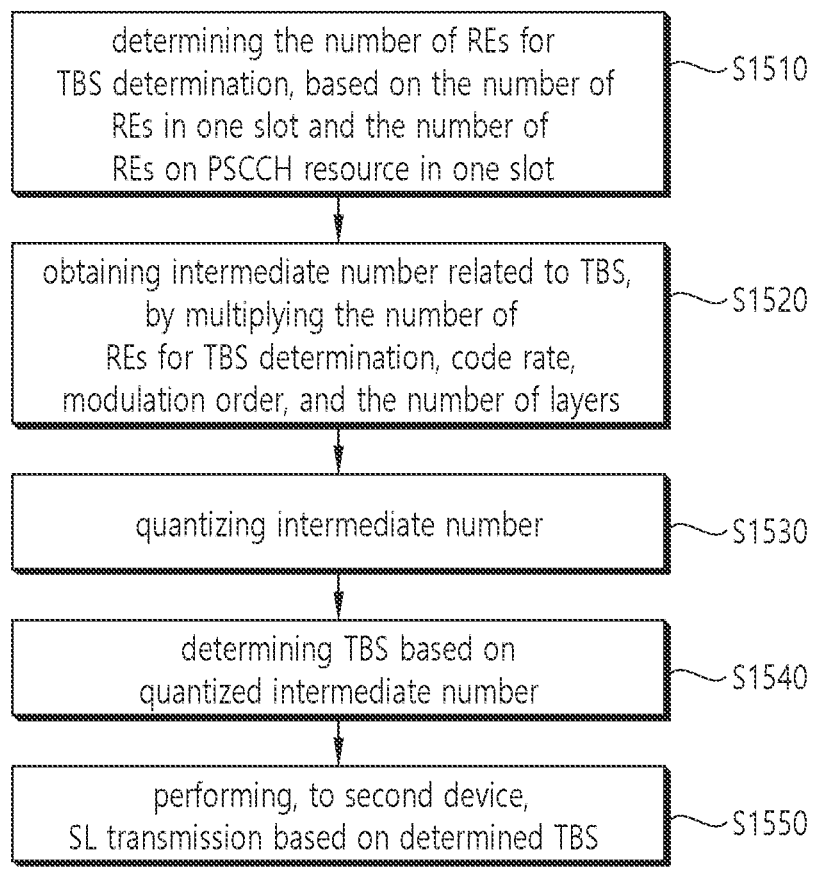
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, a first device may determine a number of resource elements (REs) for transport block size (TBS) determination, based on a number of REs in one slot and a number of REs on a physical sidelink control channel (PSCCH) resource in the one slot. Herein, for example, the number of REs for the TBS determination may be determined by excluding the number of REs on the PSCCH resource.

For example, the number of REs for the TBS determination may be determined by excluding the number of REs on the PSCCH resource from the number of REs included in the one slot and one or more resource blocks (RBs) allocated for the first device. For example, the one or more RBs may include a physical sidelink shared channel (PSSCH) resource.

For example, the one slot may include the PSCCH resource and the PSSCH resource, and the PSSCH resource may be related to the PSCCH resource. For example, REs related to the PSSCH resource may include REs to which data is mapped among REs on the PSSCH resource. For example, the REs related to the PSSCH resource may exclude REs to which control information is mapped among the REs on the PSSCH resource. For example, the control information may include a second sidelink control information (SCI) mapped to REs on the PSSCH resource. For example, the REs related to the PSSCH resource may exclude REs to which a reference signal is mapped among the REs on the PSSCH resource. For example, the reference signal may include at least one of a demodulation reference signal (DMRS) or a channel state information reference signal (SL CSI-RS) mapped to REs on the PSSCH resource.

For example, the number of REs for the TBS determination may be determined based on a pre-configured number of symbols or a pre-configured number of resource blocks (RBs) available for PSSCH transmission in the one slot. For example, the pre-configured number of symbols may be a minimum number of symbols, a maximum number of symbols, or an average number of symbols available for PSSCH transmission in the one slot, and the pre-configured number of RBs may be a minimum number of RBs, a maximum number of RBs, or an average number of RBs available for PSSCH transmission in the one slot. Herein, for example, based on whether or not PSFCH symbol(s) are configured in the same slot, the first device may (implicitly) determine the maximum number of symbols available for PSSCH transmission in the one slot. For example, based on whether or not PSFCH symbol(s) are configured in the same slot, the first device may (implicitly) determine the minimum number of symbols available for PSSCH transmission in the one slot. For example, based on whether or not PSFCH symbol(s) are configured in the same slot, the first device may (implicitly) determine the average number of symbols available for PSSCH transmission in the one slot. For example, based on the number of PSFCH symbols being configured in the same slot, the first device may (implicitly) determine the maximum number of symbols available for PSSCH transmission in the one slot. For example, based on the number of PSFCH symbols being configured in the same slot, the first device may (implicitly) determine the minimum number of symbols available for PSSCH transmission in the one slot. For example, based on the number of PSFCH symbols being configured in the same slot, the first device may (implicitly) determine the average number of symbols available for PSSCH transmission in the one slot.

For example, the number of REs for the TBS determination may be determined based on a number of symbols or a number of RBs of a physical sidelink shared channel (PSSCH) resource used by the first device for initial transmission. For example, the number of REs for the TBS determination may be determined based on the minimum value among the number of symbols related to PSSCH resource(s) to be used by the first device for initial transmission and retransmission. For example, the number of REs for the TBS determination may be determined may be determined based on the maximum value among the number of symbols related to PSSCH resource(s) to be used by the first device for initial transmission and retransmission. For example, the number of REs for the TBS determination may be determined based on an average value of the number of symbols related to PSSCH resource(s) to be used by the first device for initial transmission and retransmission. For example, the number of REs for the TBS determination may be determined based on the minimum value among the number of RBs related to PSSCH resource(s) to be used by the first device for initial transmission and retransmission. For example, the number of REs for the TBS determination may be determined may be determined based on the maximum value among the number of RBs related to PSSCH resource(s) to be used by the first device for initial transmission and retransmission. For example, the number of REs for the TBS determination may be determined based on an average value of the number of RBs related to PSSCH resource(s) to be used by the first device for initial transmission and retransmission.

For example, the number of REs for the TBS determination may be determined by excluding a pre-configured overhead related to control information. For example, the number of REs for the TBS determination may be determined by excluding a pre-configured overhead related to a reference signal. For example, the number of REs for the TBS determination may be determined by excluding the largest value among overheads related to the reference signal. For example, the number of REs for the TBS determination may be determined by excluding the smallest value among overheads related to the reference signal. For example, the number of REs for the TBS determination may be determined by excluding an average value of overheads related to the reference signal.

For example, the number of REs for the TBS determination may be determined by excluding a number of REs related to a physical sidelink feedback channel (PSFCH) resource in the one slot.

In step S1520, the first device may obtain intermediate number related to TBS, by multiplying the number of REs for the TBS determination, a code rate, a modulation order, and a number of layers.

In step S1530, the first device may quantize the intermediate number.

In step S1540, the first device may determine the TBS based on the quantized intermediate number.

In step S1550, the first device may perform, to a second device, sidelink (SL) transmission based on the determined TBS.

The proposed method can be applied to device(s) described below. First, the processor (102) of the first device (100) may determine a number of resource elements (REs) for transport block size (TBS) determination, based on a number of REs in one slot and a number of REs on a physical sidelink control channel (PSCCH) resource in the one slot. Herein, for example, the number of REs for the TBS determination may be determined by excluding the number of REs on the PSCCH resource. In addition, the processor (102) of the first device (100) may obtain intermediate number related to TBS, by multiplying the number of REs for the TBS determination, a code rate, a modulation order, and a number of layers. In addition, the processor (102) of the first device (100) may quantize the intermediate number. In addition, the processor (102) of the first device (100) may determine the TBS based on the quantized intermediate number. In addition, the processor (102) of the first device (100) may control the transceiver (106) to perform, to a second device, sidelink (SL) transmission based on the determined TBS.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a number of resource elements (REs) for transport block size (TBS) determination, based on a number of REs in one slot and a number of REs on a physical sidelink control channel (PSCCH) resource in the one slot; obtain intermediate number related to TBS, by multiplying the number of REs for the TBS determination, a code rate, a modulation order, and a number of layers; quantize the intermediate number; determine the TBS based on the quantized intermediate number; and perform, to a second device, sidelink (SL) transmission based on the determined TBS, wherein the number of REs for the TBS determination is determined by excluding the number of REs on the PSCCH resource.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine a number of resource elements (REs) for transport block size (TBS) determination, based on a number of REs in one slot and a number of REs on a physical sidelink control channel (PSCCH) resource in the one slot; obtain intermediate number related to TBS, by multiplying the number of REs for the TBS determination, a code rate, a modulation order, and a number of layers; quantize the intermediate number; determine the TBS based on the quantized intermediate number; and perform, to a second UE, sidelink (SL) transmission based on the determined TBS, wherein the number of REs for the TBS determination is determined by excluding the number of REs on the PSCCH resource.

Based on an embodiment of the present disclosure, a non-transitory computer-readable storage medium storing instructions may be provided. For example, the instructions, when executed, may cause a first device to: determine a number of resource elements (REs) for transport block size (TBS) determination, based on a number of REs in one slot and a number of REs on a physical sidelink control channel (PSCCH) resource in the one slot; obtain intermediate number related to TBS, by multiplying the number of REs for the TBS determination, a code rate, a modulation order, and a number of layers; quantize the intermediate number; determine the TBS based on the quantized intermediate number; and perform, to a second device, sidelink (SL) transmission based on the determined TBS, wherein the number of REs for the TBS determination is determined by excluding the number of REs on the PSCCH resource.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
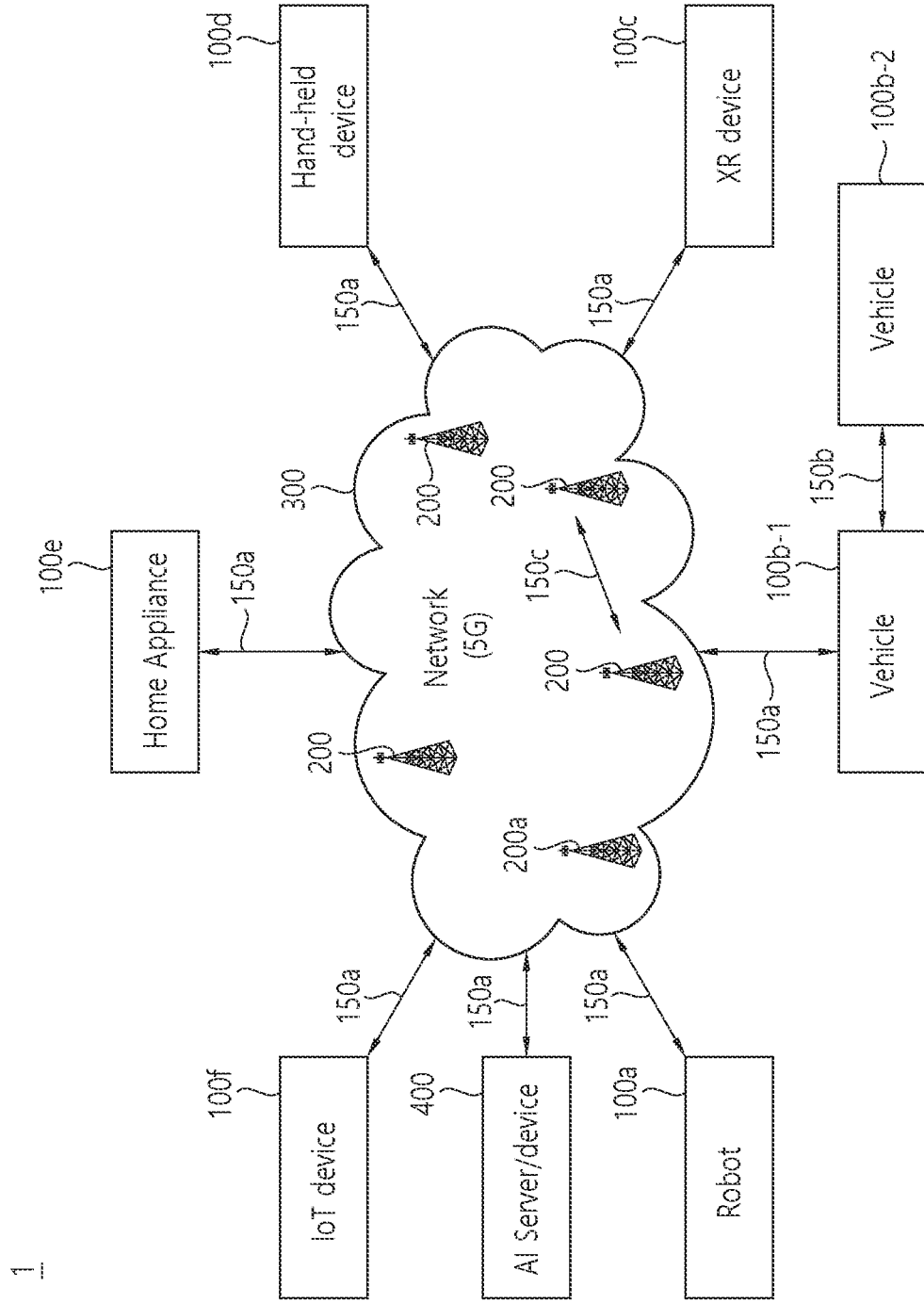
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
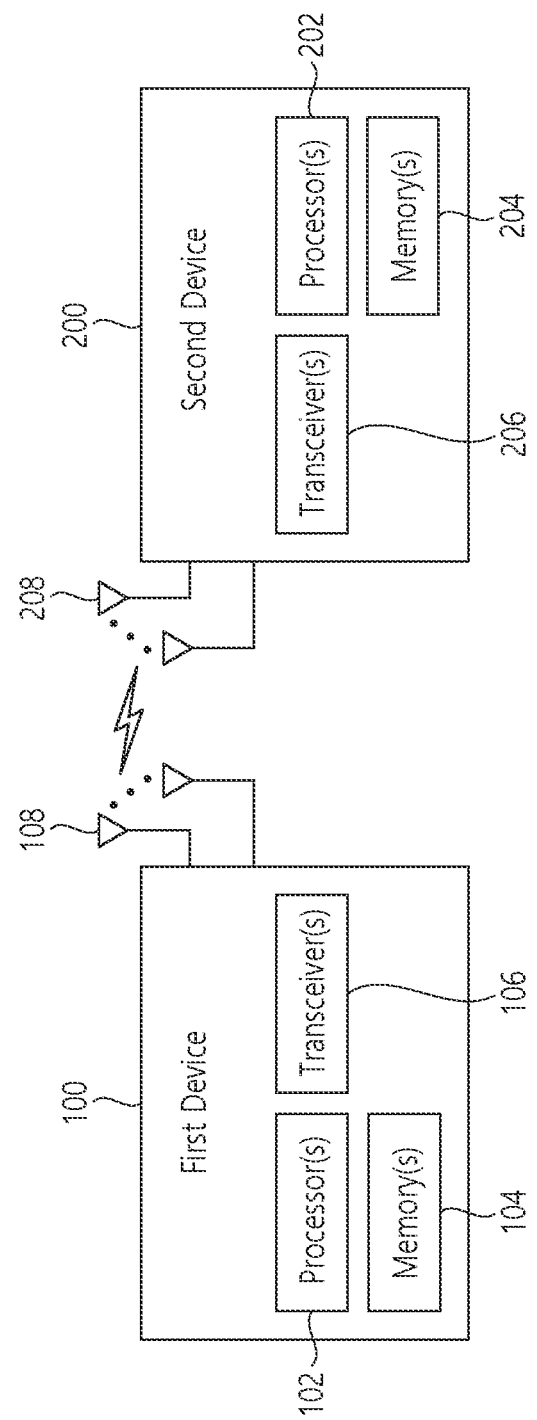
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
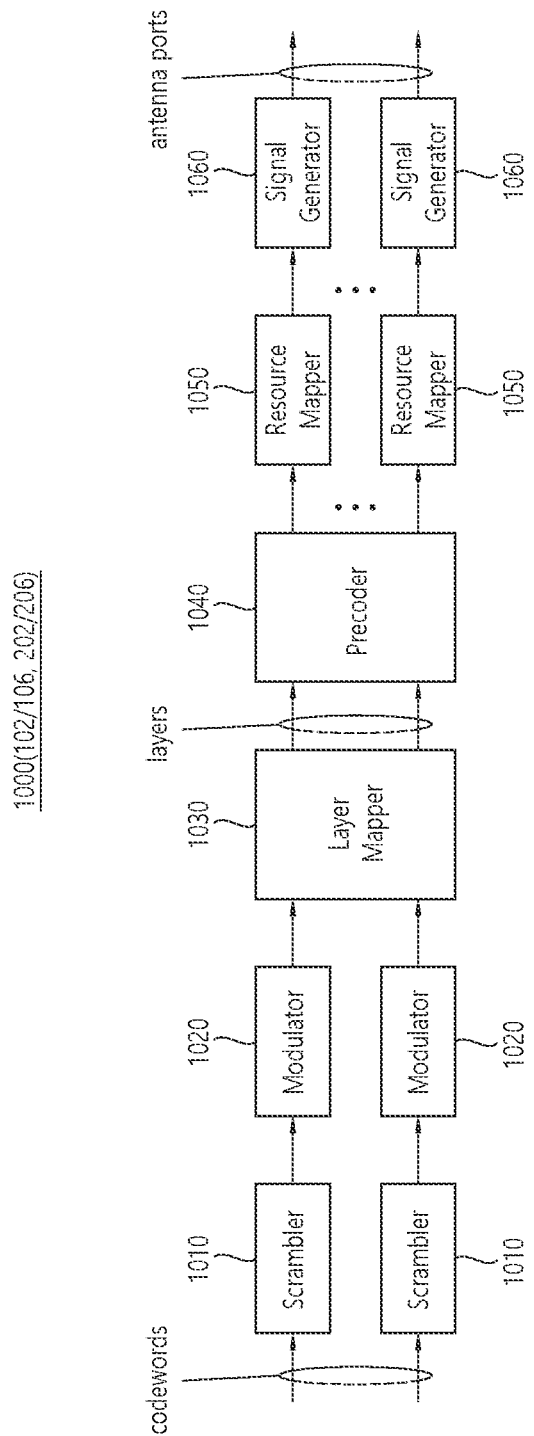
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
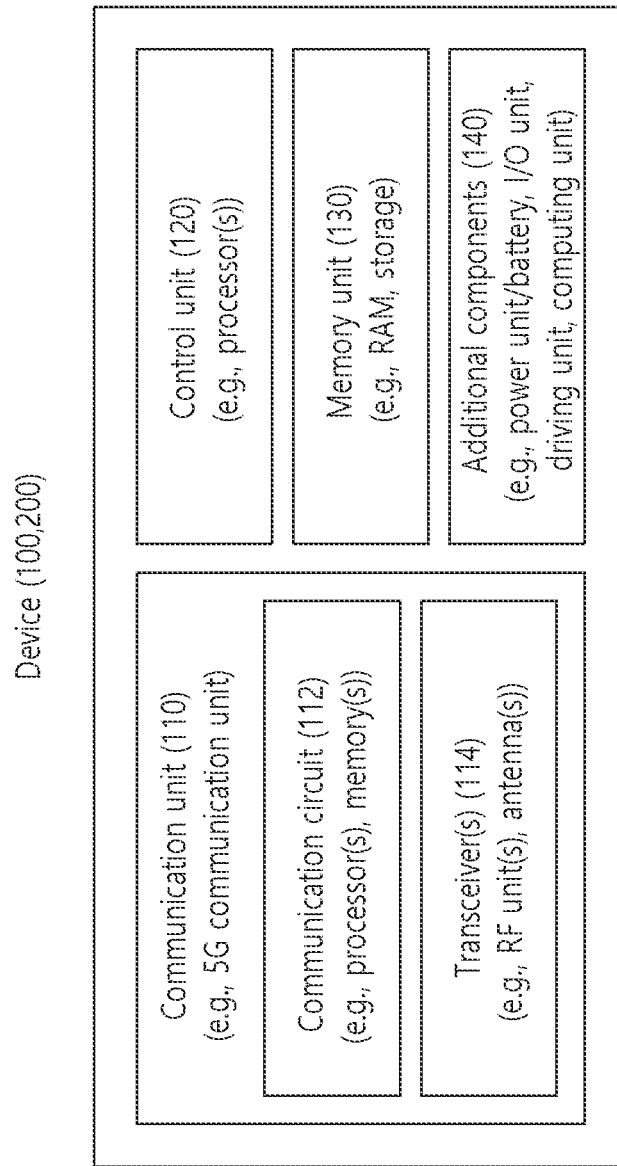
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
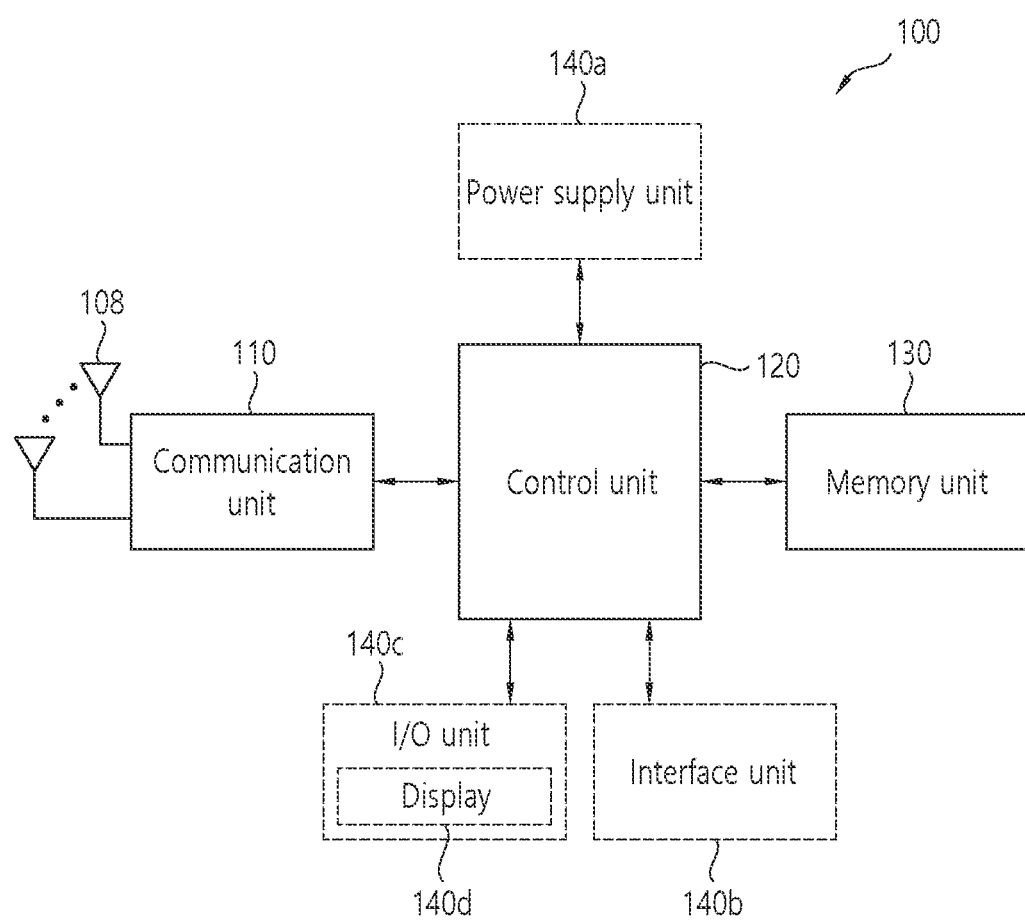
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
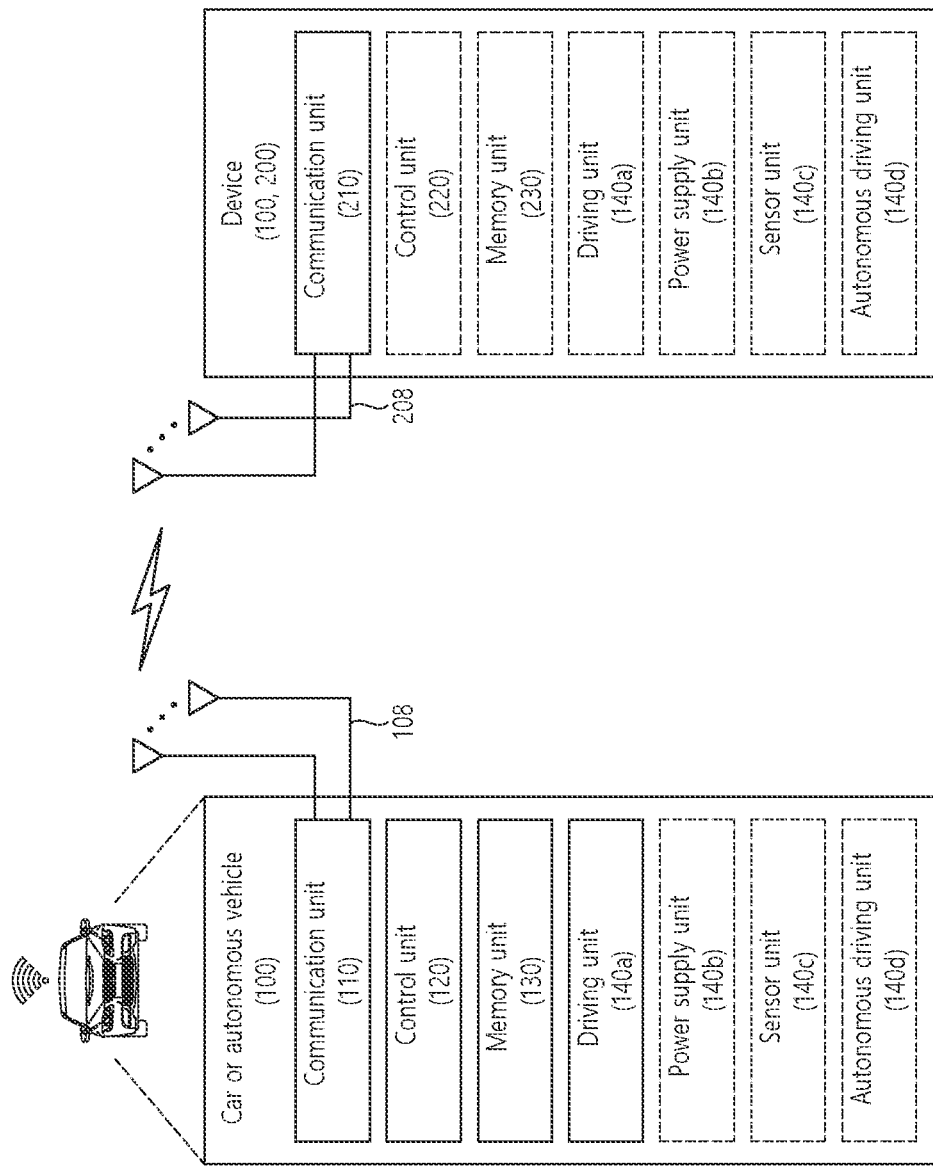
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   obtaining a number of resource elements (REs) within one slot based on a number of symbols used for sidelink (SL) within the one slot and a total number of resource blocks (RBs) allocated for physical sidelink shared channel (PSSCH);
   determining a total number of REs for transport block size (TBS) determination, by excluding a number of REs for physical sidelink control channel (PSCCH) within the one slot from the number of REs within the one slot;
   obtaining intermediate number related to TBS, by multiplying the total number of REs for the TBS determination, a code rate, a modulation order, and a number of layers;
   quantizing the intermediate number;
   determining the TBS based on the quantized intermediate number; and
   performing, to a second device, SL transmission based on the determined TBS.

2. The method of claim 1, wherein the number of symbols used for the SL within the one slot is a number of symbols allowed for SL communication within the one slot included in a resource pool.

3. The method of claim 1, wherein the total number of REs for the TBS determination is determined by further excluding a number of REs for PSCCH demodulation reference signal (DMRS) and a number of REs for sidelink control information on the PSSCH.

4. The method of claim 1, wherein the total number of REs for the TBS determination is determined by further excluding a pre-configured overhead related to control information.

5. The method of claim 1, wherein the total number of REs for the TBS determination is determined by further excluding a pre-configured overhead related to a reference signal.

6. The method of claim 1, wherein the total number of REs for the TBS determination is determined by further excluding a number of REs related to a physical sidelink feedback channel (PSFCH) resource within the one slot.

7. A first device adapted to perform wireless communication, the first device comprising:
   at least one transceiver;
   at least one processor; and at least one memory connected to the at least one processor and storing instructions that, based on being executed, cause the first device to perform operations comprising:

obtaining a number of resource elements (REs) within one slot based on a number of symbols used for sidelink (SL) within the one slot and a total number of resource blocks (RBs) allocated for physical sidelink shared channel (PSSCH);

determining a total number of REs for transport block size (TBS) determination, by excluding a number of REs for physical sidelink control channel (PSCCH) within the one slot from the number of REs within the one slot;

obtaining intermediate number related to TBS, by multiplying the total number of REs for the TBS determination, a code rate, a modulation order, and a number of layers;

quantizing the intermediate number;

determining the TBS based on the quantized intermediate number; and performing, to a second device, SL transmission based on the determined TBS.

8. The first device of claim 7, wherein the number of symbols used for the SL within the one slot is a number of symbols allowed for SL communication within the one slot included in a resource pool.

9. The first device of claim 7, wherein the total number of REs for the TBS determination is determined by further excluding a number of REs for PSCCH demodulation reference signal (DMRS) and a number of REs for sidelink control information on the PSSCH.

10. The first device of claim 7, wherein the total number of REs for the TBS determination is determined by further excluding a pre-configured overhead related to control information.

11. The first device of claim 7, wherein the total number of REs for the TBS determination is determined by further excluding a pre-configured overhead related to a reference signal.

12. The first device of claim 7, wherein the total number of REs for the TBS determination is determined by further excluding a number of REs related to a physical sidelink feedback channel (PSFCH) resource within the one slot.

* * * * *